(12) United States Patent
Ryou et al.

(10) Patent No.: US 9,786,970 B2
(45) Date of Patent: Oct. 10, 2017

(54) AIR-METAL SECONDARY BATTERY UNIT AND AIR-METAL SECONDARY BATTERY MODULE INCLUDING SAME

(75) Inventors: Byung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 0 days.

(21) Appl. No.: 13/980,890

(22) PCT Filed: Jan. 12, 2012

(86) PCT No.: PCT/KR2012/000300
§ 371 (c)(1),
(2), (4) Date: Jul. 22, 2013

(87) PCT Pub. No.: WO2012/102500
PCT Pub. Date: Aug. 2, 2012

(65) Prior Publication Data
US 2013/0309584 A1    Nov. 21, 2013

(30) Foreign Application Priority Data
Jan. 28, 2011 (KR) .................. 10-2011-0008596

(51) Int. Cl.
*H01M 12/08* (2006.01)
*H01M 2/12* (2006.01)

(52) U.S. Cl.
CPC ............. *H01M 12/08* (2013.01); *H01M 2/12* (2013.01); *Y02E 60/128* (2013.01)

(58) Field of Classification Search
USPC ........................................ 429/403, 405–406
See application file for complete search history.

(56) References Cited

U.S. PATENT DOCUMENTS

| | | | | |
|---|---|---|---|---|
| 4,842,963 A | * | 6/1989 | Ross, Jr. | ............... H01M 4/244 29/623.1 |
| 4,925,744 A | | 5/1990 | Niksa et al. | |
| 5,011,747 A | * | 4/1991 | Strong | ................... H01M 2/38 429/407 |

(Continued)

FOREIGN PATENT DOCUMENTS

| | | |
|---|---|---|
| CN | 1338125 A | 2/2002 |
| CN | 1613161 A | 5/2005 |

(Continued)

OTHER PUBLICATIONS

International Search Report for PCT/KR2012/000300.

(Continued)

*Primary Examiner* — Osei Amponsah
(74) *Attorney, Agent, or Firm* — The PL Law Group, PLLC

(57) ABSTRACT

An air-metal secondary battery module includes one or more metal-air secondary battery units, each of which has a water intake part for taking an aqueous solution therein and a gas outlet port for discharging gas generated during charging; an aqueous solution storage unit which stores the aqueous solution; an aqueous solution supply unit which connects the one or more water intake parts to the aqueous solution storage unit; and a gas discharge unit which is connected to the one or more gas outlet ports to discharge the gas discharged from the gas outlet ports to the outside.

9 Claims, 3 Drawing Sheets

(56) References Cited

U.S. PATENT DOCUMENTS

| | | | | |
|---|---|---|---|---|
| 5,254,414 A * | 10/1993 | Tsenter | ............... | H01M 12/08 429/403 |
| 5,716,726 A * | 2/1998 | Cheiky | ............... | H01M 2/362 429/144 |
| 2003/0228522 A1* | 12/2003 | Yang | ................ | H01M 12/06 429/306 |
| 2008/0096096 A1* | 4/2008 | Komori | ................ | H01M 2/12 429/56 |
| 2008/0213654 A1 | 9/2008 | Fensore | | |

FOREIGN PATENT DOCUMENTS

| | | | |
|---|---|---|---|
| CN | 1298074 | A | 1/2007 |
| JP | 08-511896 | A | 12/1996 |
| JP | 1996511896 | A | 12/1996 |
| JP | 2010-267476 | A | 11/2010 |
| KR | 10-1998-001952 | A | 6/1998 |
| KR | 10-2004-0071298 | A | 8/2004 |
| KR | 10-2004-0094710 | A | 11/2004 |
| WO | 96/19838 | A1 | 6/1996 |
| WO | 97/44848 | A1 | 11/1997 |
| WO | 00/44057 | A1 | 7/2000 |

OTHER PUBLICATIONS

European Search Report dated Dec. 16, 2014 in a counterpart European application No. EP 12739180.

Office Action issued on Jan. 26, 2015 from from Chinese Intellectual Property Office in a counterpart Chinese Patent Application No. 201280006601.2.

Office action Jun. 26, 2012 from Korean Intellectual Property Office (KIPO) in a counterpart Korean patent application No. 10-2011-0008596.

* cited by examiner

AIR-METAL SECONDARY BATTERY UNIT AND AIR-METAL SECONDARY BATTERY MODULE INCLUDING SAME

CROSS REFERENCE TO RELATED APPLICATIONS AND CLAIM OF PRIORITY

This patent application is a National Phase application under 35 U.S.C. §371 of International Application No. PCT/KR2012/000300, filed Jan. 12, 2012, which claims priority to Korean Patent Application No. 10-2011-0008596 filed Jan. 28, 2011, entire contents of which are incorporated herein by reference.

BACKGROUND

1. Field of the Invention

The present invention relates to an air-metal secondary battery unit and an air-metal secondary battery module including the same, and more particularly, to an air-metal secondary battery unit that enables discharge and charge, and an air-metal secondary battery module including at least one air-metal secondary battery unit.

2. Description of the Related Art

An electrochemical power source is an apparatus in which electrical energy can be generated through electrochemical reaction. The apparatus includes an air-metal battery such as an air-zinc battery, an air-aluminum battery, and so on. The air-metal battery employs a negative electrode formed of a metal converted into a metal oxide during discharge, and a positive electrode as an air positive electrode film, which is a transmissive film including water molecules, and in contact with oxygen in the air to generate hydroxyl ions.

Such an air-metal battery has various advantages in comparison with a conventional hydrogen fuel cell. In particular, since a fuel such as zinc is plentifully provided as a metal or an oxide thereof, supply of energy provided from the air-metal battery is not visually exhausted. In addition, while the conventional hydrogen fuel cells require recharge, the air-metal battery can be electrically recharged and can transmit a higher output voltage (1 to 4.5 volts) than the conventional fuel cells.

Such an air-metal battery that enables discharge and charge is referred to as an air-metal secondary battery, and the air-metal secondary battery has the air positive electrode film that functions as a positive electrode during discharge and reacts with the air or oxygen supplied from another supply source through the following chemical formula.

$$O^2 + 2H_2O + 4e^- \leftrightarrow 4OH^-$$ [Chemical Formula 1]

A hydroxyl ion generated through the chemical formula moves to a zinc gel, which is a negative electrode gel of the air-metal secondary battery, to form zinc hydroxide on a surface of the zinc gel. Then, the zinc hydroxide is decomposed into zinc oxide and water is discharged to become an alkaline aqueous solution. Such a reaction can be expressed through the following chemical formula.

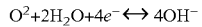

$$Zn + 2OH^- \leftrightarrow Zn(OH)_2 + 2e^-$$

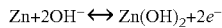

$$Zn + 2OH^- \leftrightarrow ZnO + H_2O + 2e^-$$ [Chemical Formula 2]

The air-metal secondary battery is discharged through the above-mentioned reaction to supply electrical energy to the outside. Then, when the air-metal secondary battery arrives at a discharge limit to stop supply of the electrical energy to the outside, the battery can be electrically charged to be reused.

However, discharge and charge processes of the air-metal secondary battery are repeated as described above, moisture in the negative electrode gel may be reduced and the negative electrode gel, i.e., a mixture of electrolyte and zinc metal, may be cured to make it impossible to reuse the air-metal secondary battery.

In addition, when an electron ($2e^-$) having a negative charge is supplied into zinc oxide (ZnO) upon charge of the air-metal secondary battery, a zinc ion ($Zn^{2+}$) is reduced into zinc and an oxygen ion ($O^{2-}$) is separated from the zinc ion. The oxygen ion separated from the zinc ion passes through a negative electrode collector of the air-metal secondary battery to be reduced into oxygen ($O_2$).

As described above, a case of the air-metal secondary battery configured to accommodate the negative electrode gel, the air positive electrode film, and the negative electrode collector may be damaged due to oxygen generated in the air-metal secondary battery upon charge thereof.

Meanwhile, in recent times, as eco-friendly energy has come into the spotlight, research on modularization in which one or more air-metal secondary batteries are connected to constitute a battery module to be used for a vehicle battery that requires a large capacity of electrical energy has been continuously conducted. However, if these problems cannot be solved, commercialization may be impossible.

SUMMARY

The present invention is directed to an air-metal secondary battery unit having a water intake section configured to collect an aqueous solution for supplementing moisture into a negative electrode gel and a gas discharge port configured to discharge a gas generated upon charge, and an air-metal secondary battery module configured to supply the aqueous solution into one or more air-metal secondary batteries and discharge a gas generated in the one or more air-metal secondary batteries to the outside upon charge.

According to an aspect of the present invention, there is provided an air-metal secondary battery module including: one or more metal-air secondary battery units having water intake sections configured to collect an aqueous solution and gas discharge ports configured to discharge a gas generated upon charge; an aqueous solution storage unit configured to store the aqueous solution; an aqueous solution supply unit configured to connect the one or more water intake sections and the aqueous solution storage unit; and a gas discharge unit connected to the one or more gas discharge ports and configured to discharge the gas discharged from the gas discharge ports to the outside.

Each of the one or more metal-air secondary battery units may include a battery case having the water intake section and the gas discharge port; a negative electrode gel accommodated in the battery case, and configured to receive the aqueous solution from the water intake section to supplement moisture discharged upon discharge; an air positive electrode film accommodated in the battery case; a gasket accommodated in the battery case and disposed between the negative electrode gel and the air positive electrode film; and a negative electrode collector disposed between an inner wall of the battery case and the negative electrode gel.

The gas discharge unit may include a gas discharge conduit; one or more branch conduits branched off from the gas discharge conduit and connected to the one or more gas discharge port; and a pressure reduction apparatus connected to at least one of one end and the other end of the gas discharge conduit.

The pressure reduction apparatus may be any one of a fan and a vacuum pump.

The one or more air-metal secondary battery units may be spaced apart from each other at predetermined intervals.

The air-metal secondary battery module may further include a module case configured to accommodate the one or more air-metal secondary battery units, the aqueous solution storage unit, the aqueous solution supply unit and the gas discharge unit and having an opening/closing section configured to expose at least one of one end and the other end of the gas discharge unit to the outside to be opened and closed at a portion thereof.

The negative electrode gel may be zinc gel.

According to another aspect of the present invention, there is provided a metal-air secondary battery unit including: a battery case having a water intake section configured to collect an aqueous solution and a gas discharge port configured to discharge a gas generated upon charge; a negative electrode gel accommodated in the battery case and configured to receive the aqueous solution from the water intake section to supplement moisture discharged upon discharge; an air positive electrode film accommodated in the battery case; and a gasket accommodated in the battery case and disposed between the negative electrode gel and the air positive electrode film.

The battery case may include a lower case having the water intake section and the gas discharge port, configured to accommodate the negative electrode gel, the air positive electrode film and the gasket, and opened at a portion of a surface thereof in contact with the air positive electrode film; and an upper case configured to close the lower case.

The metal-air secondary battery unit may further include a negative electrode collector accommodated in the battery case and disposed between the upper case and the negative electrode gel.

The upper case and the air positive electrode film may have a hole for connecting a terminal or an electrical wire.

According to the present invention, since curing of the negative electrode gel due to the discharge and charge of the one or more metal-air secondary battery units and expansion of the battery case due to generation of the gas can be prevented, the metal-air secondary battery can be modularized to be commercialized in a field that requires a large capacity of electrical energy such as vehicle batteries.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
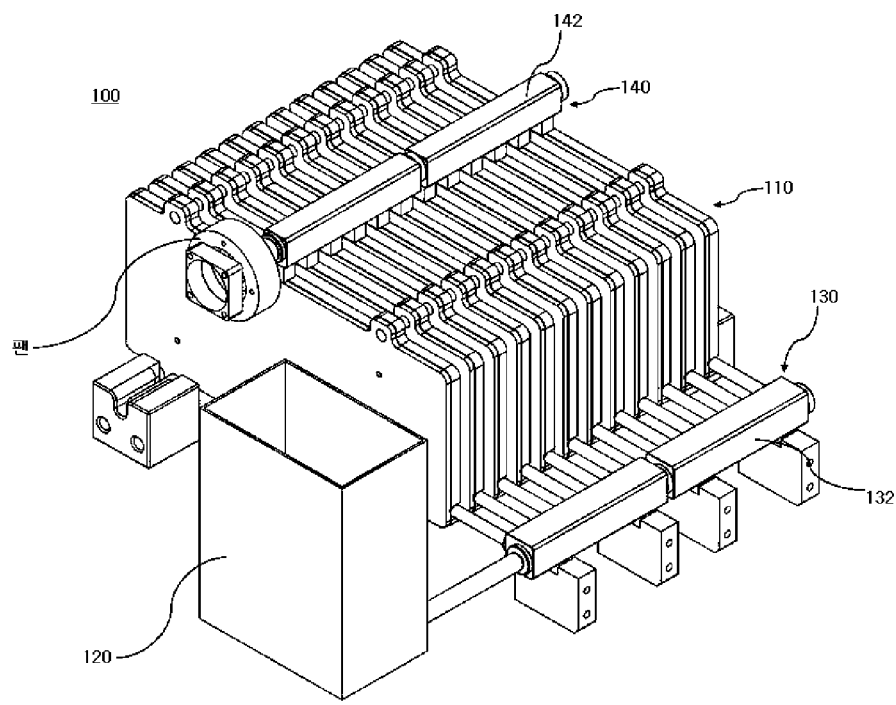
FIGS. 1 to 4 are configuration views showing an air-metal secondary battery module according to an embodiment of the present invention.

Embodiments of the invention will be described with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Like reference numerals in the drawings designate like or similar elements in various aspects.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

FIGS. 1 to 4 are configuration views showing an air-metal secondary battery module according to an embodiment of the present invention.

An air-metal secondary battery module 100 according to the embodiment of the present invention includes one or more air-metal secondary battery units 110, an aqueous solution storage unit 120, an aqueous solution supply unit 130 and a gas discharge unit 140.

The one or more air-metal secondary battery units 110 have water intake sections configured to collect an aqueous solution and gas discharge ports configured to discharge a gas generated during charge. Detailed description will be given with reference to FIG. 5.

The one or more air-metal secondary battery units 110 of the present invention may be spaced apart from each other at predetermined intervals.

The aqueous solution storage unit 120 stores the aqueous solution, which is to be supplied into the one or more air-metal secondary batteries. Here, the aqueous solution may be water but is not limited thereto.

Figure 2:
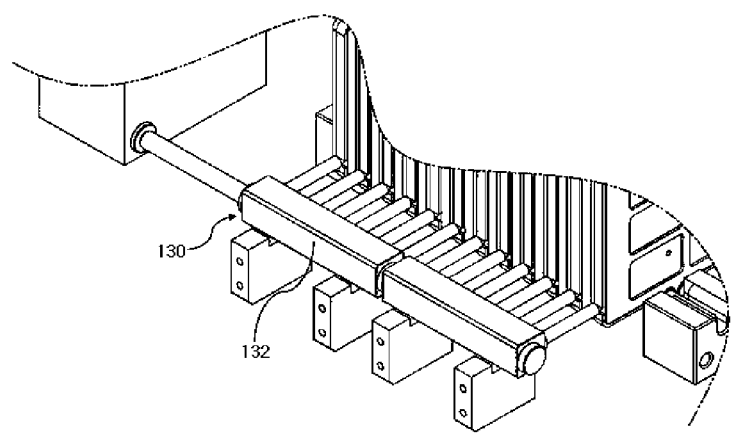

The aqueous solution supply unit 130 connects the water intake sections respectively installed at the one or more air-metal secondary battery units 110 to the aqueous solution storage unit 120. Here, in the aqueous solution supply unit 130, as shown in FIG. 2, an aqueous solution supply conduit 132 is connected to the aqueous solution storage unit 120, and one or more conduits branch off from the aqueous solution supply conduit 132 to be connected to the one or more water intake sections.

The gas discharge unit 140 is connected to one or more gas discharge ports to discharge the gas discharged from the gas discharge port to the outside. Here, the gas may include oxygen only, or may include impurities in addition to oxygen.

Meanwhile, in the gas discharge unit 140, one or more conduits may branch off from a gas discharge conduit 142 to be connected to one or more gas discharge ports, and a pressure reduction apparatus may be connected to at least one of one end and the other end of the gas discharge conduit 142. Here, the pressure reduction apparatus is connected to reduce a pressure in the one or more air-metal secondary battery units 110 and a pressure in the one or more branched conduits.

The pressure in the one or more air-metal secondary battery units 110 and the one or more branched conduits is reduced so that the gas is rapidly exhausted from the one or more gas discharge ports through Bernoulli's principle.

The pressure reduction apparatus of the present invention may be a fan installed at at least one of one end and the other end of the gas discharge conduit 142 or a vacuum pump (not shown) connected to at least one of one end and the other end of the gas discharge conduit 142.

Figure 3:
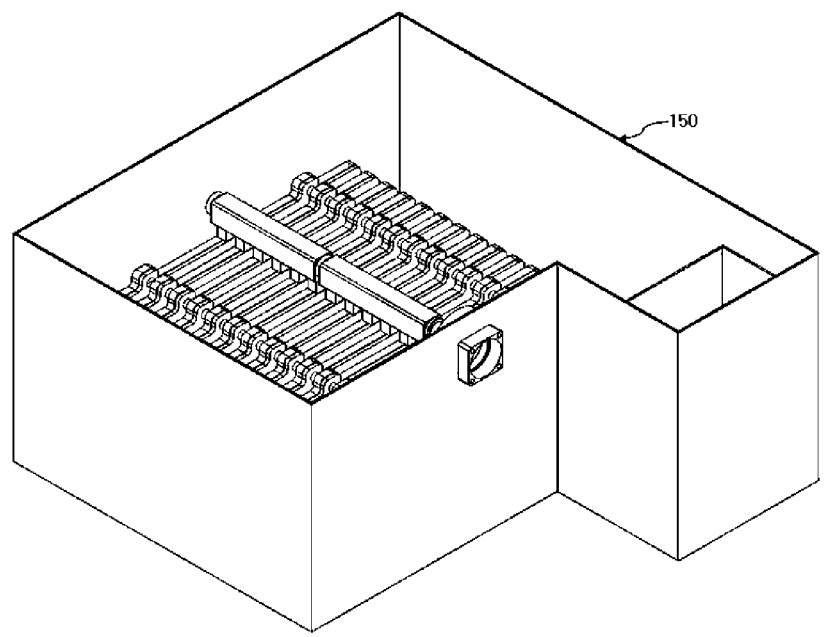
Figure 4:
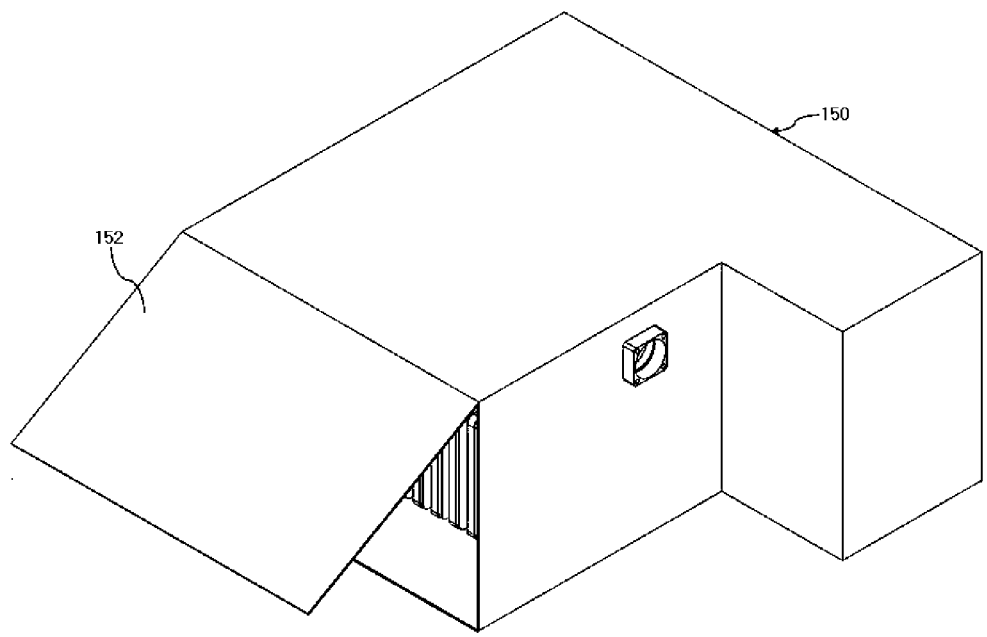

The air-metal secondary battery module 100 of the present invention includes, as shown in FIGS. 3 and 4, the one or more air-metal secondary battery units 110, the aqueous solution storage unit 120, the aqueous solution supply unit 130 and the gas discharge unit 140, and may further include a module case 150 configured to expose at least one of one end and the other end of the gas discharge unit 140 to the outside and having an opening/closing section 152 formed at a portion thereof to be opened and closed as shown in FIG. 4.

Figure 5:
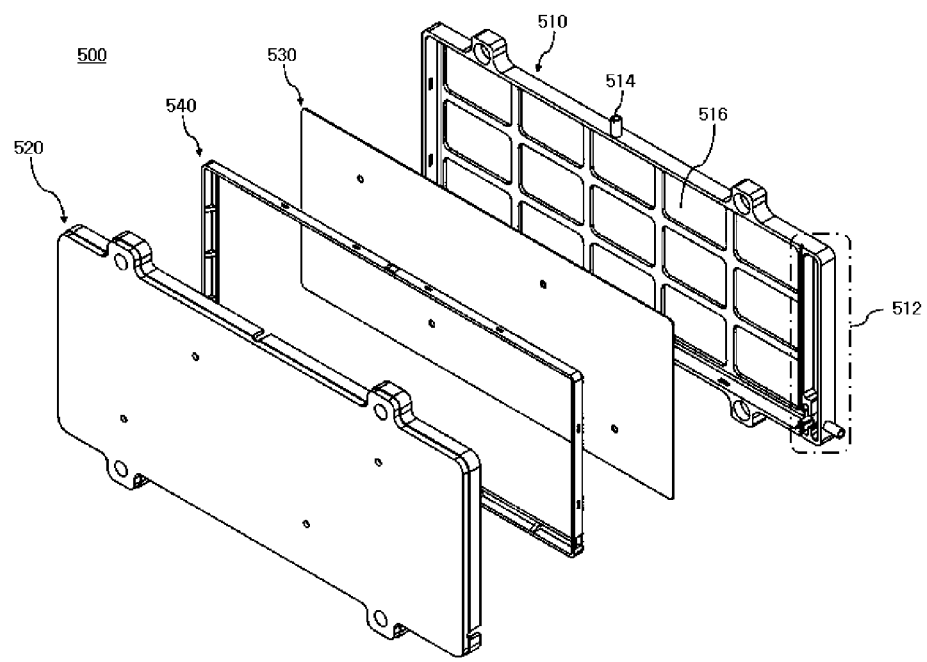
FIG. 5 is an exploded perspective view of the air-metal secondary battery unit according to the embodiment of the present invention.
Figure 6:
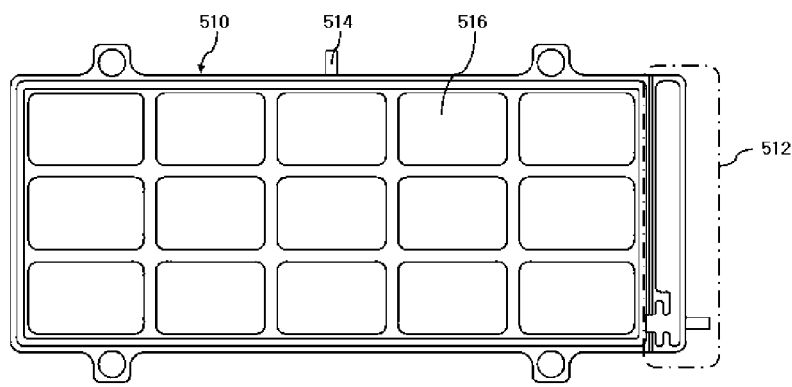
FIG. 6 is a view showing a lower case of the air-metal secondary battery unit according to the embodiment of the present invention.

FIG. 5 is an exploded perspective view of the air-metal secondary battery unit according to the embodiment of the present invention.

An air-metal secondary battery unit 500 according to the embodiment of the present invention includes a battery case having a lower case 510 and an upper case 520, a negative electrode gel (not shown), an air positive electrode film 530, a gasket 540 and a negative electrode collector (not shown).

The battery case has a water intake section 512 configured to collect an aqueous solution and a gas discharge port 514 configured to discharge a gas generated upon charge.

In other words, the water intake section 512 is formed in one space of the lower case 510, the gas discharge port 514 is formed at one end of the lower case 510, and the upper case 520 closes the lower case 510. Here, one or more holes for connecting a terminal or an electrical wire to the negative electrode collector (not shown) may be formed in the upper case 520.

In addition, fixing holes are formed at lower and upper sides of a periphery of the battery case, i.e., the lower case 510 and the upper case 520, to insert a rod having a certain length therethrough so that the one or more air-metal secondary battery units 110 can be spaced apart from each other at predetermined intervals as shown in FIG. 1.

The lower case 510 of the present invention accommodates the negative electrode gel (not shown), the air positive electrode film 530 and the gasket 540 at the other space, and may have one or more openings 516 formed at a portion of a surface thereof in contact with the air positive electrode film 530. Here, the one or more openings 516 are formed in the lower case 510 so that the air is in communication with the air positive electrode film 530.

The negative electrode gel (not shown) is formed by mixing a metal powder in a gel state with an electrolyte, and functions as a negative electrode. Here, the negative electrode gel (not shown) may be any one of negative electrode active materials including a zinc gel.

The negative electrode gel (not shown) of the present invention is accommodated in the battery case, and receives the aqueous solution from the water intake section 512 to supplement the moisture discharged upon the discharge.

The air positive electrode film 530 may include a hydrophobic porous film, a carbon collector film, and a hydrophilic separation film, and is accommodated in the battery case. Here, one or more holes for connecting a terminal or an electrical wire may be formed in the air positive electrode film 530.

The gasket 540 is accommodated in the battery case and disposed between the negative electrode gel (not shown) and the air positive electrode film 530, adheres and fixes the air positive electrode film 530 to the lower case 510, and prevents leakage of the negative electrode gel (not shown).

The negative electrode collector (not shown) is accommodated in the battery case and disposed between the upper case 520 and negative electrode gel (not shown), and receives an electron from the negative electrode gel (not shown) to transmit the electron to the outside. Here, the negative electrode collector (not shown) may be any one of conductive structures such as a conductive net, a conductive film, a rivet, and so on.

Since the air-metal secondary battery module 100 and the air-metal secondary battery unit 500 according to the embodiment of the present invention supply the aqueous solution when the moisture is reduced in the negative electrode gel according to the discharge, a curing speed of the negative electrode gel can be remarkably reduced, and expansion and damage of the battery case due to the gas generated in the battery case upon the charge can be prevented by the gas discharge port 514 formed in the battery case and the gas discharge unit 140 of the air-metal secondary battery module 100.

While the present invention has been described with reference to specific items such as specific components, specified embodiment and drawings, these are merely provided for the purpose of understanding of the present invention. The present invention is not limited to the embodiment, and it will be apparent to those skilled in the art that various modifications and deformations may be made from the above-mentioned description.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. An air-metal secondary battery module comprising:
a plurality of metal-air secondary battery units, each metal-air secondary battery unit comprising:
a battery case comprising a lower case and an upper case covering the lower case, the lower case having a water intake section positioned at a side of the lower case to collect an aqueous solution and a gas discharge port positioned at the top of the lower case to discharge a gas generated upon charge, the lower case having an opening through which an air flows;
a negative electrode gel accommodated in the lower case to receive the aqueous solution from the water intake section to supplement moisture discharged upon discharge;
an air positive electrode film accommodated in the lower case, wherein said opening is formed at a portion of the surface of the lower case in contact with the air positive electrode film; and
a gasket accommodated in the lower case and disposed between the negative electrode gel and the air positive electrode film;
an aqueous solution storage unit storing the aqueous solution;
an aqueous solution supply unit to connect the water intake section and the aqueous solution storage unit;
a gas discharge unit connected to the gas discharge port and to discharge the gas discharged from the gas discharge port to the outside, wherein the gas discharge unit comprises:
a gas discharge conduit;

one or more branch conduits branched off from the gas discharge conduit and connected to the gas discharge port; and a pressure reduction apparatus connected to at least one of one end and the other end of the gas discharge conduit, wherein the pressure reduction apparatus is configured to reduce pressure in the metal-air secondary battery unit and pressure in the one or more branch conduits; and a module case to accommodate the plurality of air-metal secondary battery units, the aqueous solution storage unit, the aqueous solution supply unit and the gas discharge unit, the module case having an opening/closing section to open and close a flow of said air and exposing the at least one of one end and the other end of the gas discharge unit to the outside.

2. The air-metal secondary battery module according to claim 1, wherein the metal-air secondary battery unit comprises a negative electrode collector disposed between an inner wall of the battery case and the negative electrode gel.

3. The air-metal secondary battery module according to claim 1, wherein the pressure reduction apparatus is a fan or a vacuum pump.

4. The air-metal secondary battery module according to claim 1, wherein the plurality of air-metal secondary battery units are spaced apart from each other at predetermined intervals.

5. The air-metal secondary battery module according to claim 1, wherein the negative electrode gel is zinc gel.

6. The air-metal secondary battery module according to claim 1, further comprising: a negative electrode collector accommodated in the battery case and disposed between the upper case and the negative electrode gel.

7. The air-metal secondary battery module according to claim 1, wherein the upper case and the air positive electrode film have a hole for connecting a terminal or an electrical wire.

8. The air-metal secondary battery module according to claim 1, wherein the gas discharge port comprises a plurality of gas discharge ports.

9. The air-metal secondary battery module according to claim 1, wherein the aqueous solution is water.

* * * * *